July 26, 1938.  W. E. URSCHEL  2,124,934
MECHANICAL MOVEMENT AND SHREDDER
Filed March 28, 1935  2 Sheets-Sheet 1

INVENTOR.
William E. Urschel
BY
ATTORNEY

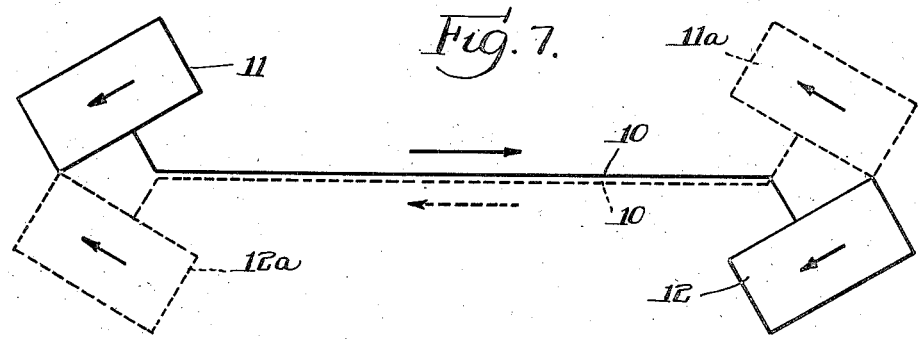
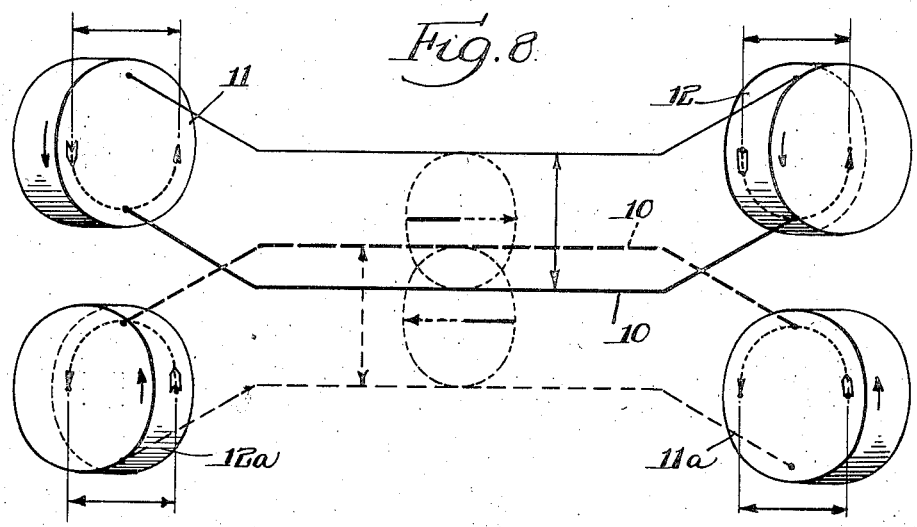
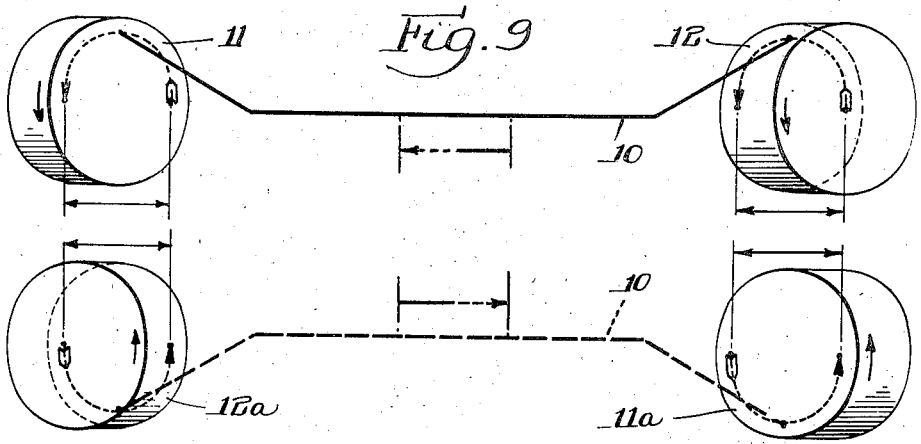

Patented July 26, 1938

2,124,934

UNITED STATES PATENT OFFICE 2,124,934

MECHANICAL MOVEMENT AND SHREDDER

William E. Urschel, Valparaiso, Ind.

Application March 28, 1935, Serial No. 13,374

11 Claims. (Cl. 146—119)

The present invention relates to a mechanical movement particularly applicable to a shredding mechanism for use with various materials including various forage crops wherein two opposed members which when formed as a shredder are provided with opposed shredding surfaces, are given movements relatively toward and from each other and simultaneously therewith a movement extending laterally or angularly with respect to their relative approaching and receding movement and wherein the angular movements of the two members are in opposite directions; to provide a mechanical movement and particularly a mechanical movement adapted for shredding mechanism wherein two opposed groups of members are mounted to receive therebetween the material to be shredded and wherein the members of each group move in closed paths toward and from each other so that when said members approach each other they will grip the material to be shredded in overlapping relation and simultaneously will have imparted thereto in opposite directions an angularly related movement which serves to tear and shred the material gripped or pinched between the members of each group.

In addition other objects of my invention are as follows:

A novel means for shredding and mangling alfalfa, soy beans, and any similar forage crop.

Improved mechanism for shredding or mangling a forage crop without danger of the crop becoming entangled with the shredding parts.

An unique mechanical arrangement of bars for providing an effective grinding, tearing and shredding effect.

These objects, and such other objects as may hereinafter appear, are obtained by the novel construction, unique arrangement and improved combination of the several elements which constitute the invention, one form of which is illustrated in the machine shown in the accompanying sheets of drawings, hereby made a part of this application, and in which.

Figure 5:
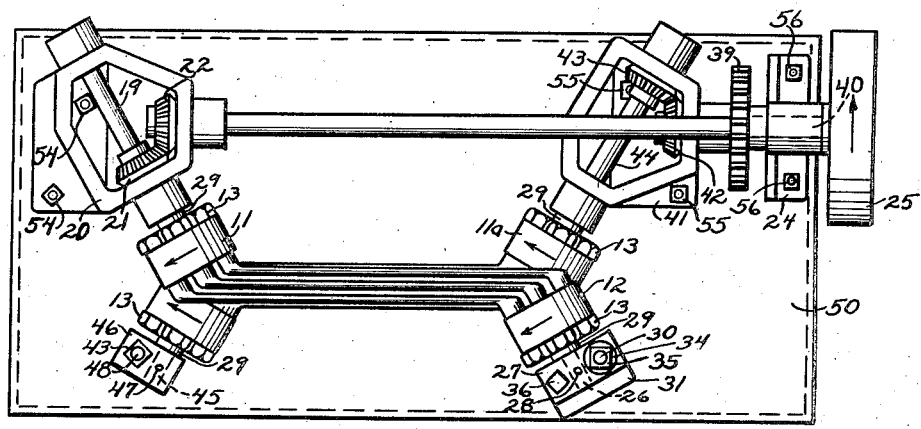
Figure 5 is a plan view of a complete machine embodying the bars shown in Figures 1 and 2 and the bearing blocks illustrated in Figures 3 and 4.

Figures 7, 8, and 9 are dagrammatic views of applicant's mechanism illustrating the relative movements of one bar only of each group, the diagrams being provided to more clearly illustrate the movements of the shredding members.

Like reference characters are used to designate similar parts in the drawings and in the following description.

While in the specification and in the drawings I have disclosed my shredding members as elongated bars, it is to be understood that the form of construction of such members is but illustrative and that any desired arrangement of opposed shredding members may be utilized within the scope of the appended claims.

Figure 1:
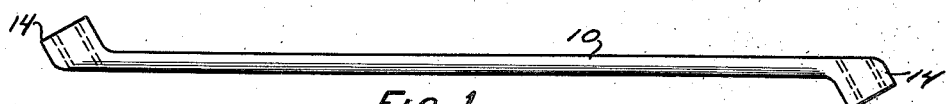
Figure 1 is a detail of one of the bars which is employed in the two series of shredding bars illustrated in Figures 5 and 6.
Figure 2:
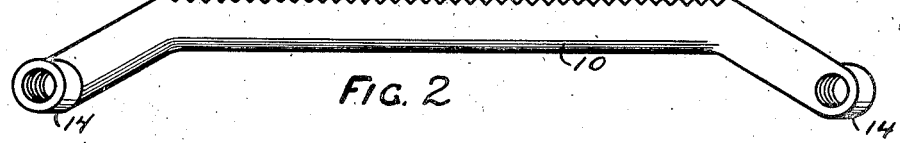
Figure 2 is a view similar to Figure 1, the bar being viewed from an angle ninety degrees removed from Figure 1.

As previously stated, bars that are advanced in a substantially circular path and that move longitudinally as they advance in such circular path are used for shredding. One of such bars is illustrated in Figures 1 and 2. Each bar, designated 10, at its ends, has an angular extension terminating in a threaded boss 14. There are teeth 58 upon the surface of the bar 10 between the end extensions thereof, the teeth 58 being best shown in Figure 2. Each boss 14 has an oblique end bearing surface, the bosses 14 being opposed and the bearing surfaces thereon being parallel, as can be seen in Figure 1.

Figure 6:
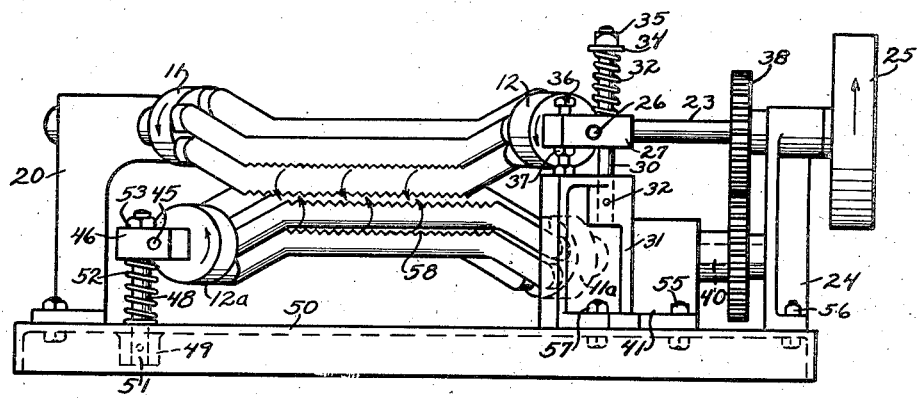
Figure 6 is a side elevation of the machine shown in Figure 5.
Figure 3:
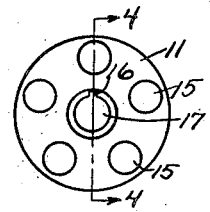
Figure 3 is an elevation of a bearing block in which a series of bars like the one illustrated in Figures 1 and 2 are mounted.
Figure 4:
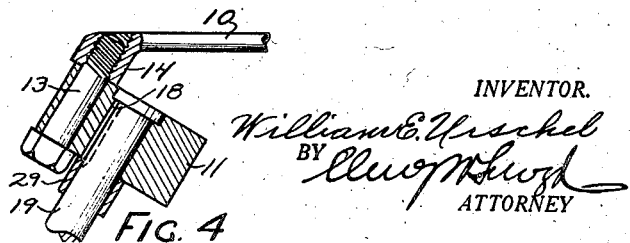
Figure 4 is a diametric section of the bearing block illustrated in Figure 3, and is taken on the line 4—4 of Figure 3.

Five bars 10 constitute each series of shredding members in the machine illustrated in Figures 5 and 6. These five bars are mounted at opposite ends upon bearing blocks 11 shown in detail in Figures 3 and 4. Each block 11 has a generally cylindrical body with five apertures 15 therethrough to receive bolts or machine screws 13. The threaded ends of bolts or machine screws 13 extend into the threaded bosses 14 of rods 10 and provide a joinder between rod and block permitting of free relative movement between the bearing face of the block 11 and the oblique bearing face on boss 14. The block 11 has a center aperture 17, such aperture defining the axis of rotation of the block.

Each series of bars 10 has its toothed surfaces projecting in one direction and toward the bars of the opposite series. The two series of bars 10 travel in adjacent circular or elliptical paths, one bar from one series riding between and in close proximity to two bars in the other series as the two series of bars are oppositely rotated.

The bars 10 and bearing blocks 11 may be mounted in a machine as shown in Figures 5 and 6. In such machine, the bearing blocks are designated 11 and 12 for the upper series of bars 10, and 11a and 12a for the lower series of bars. Blocks 11 and 11a are the driving blocks and blocks 12 and 12a are idler blocks. Blocks 11 and 11a are like blocks 12 and 12a save that the former have a keyway 16 in the central aperture 17. Blocks 11 and 12, and blocks 11a and 12a, respectively, have parallel axes of rotation. The axes of rotation are not in alignment but are offset, hence the bars 10 of themselves do not rotate but travel in an arcuate or elliptical path the center of which path is equidistant from the centers of the several bars. Bars 10 also reciprocate or are moved longitudinally as they rotate. One cycle of reciprocation is completed during each complete movement of a bar around its circular path.

The machine illustrated in Figures 5 and 6 comprise a base 50 which may be of an inverted dish type. The upper surface of base 50 is substantially a flat plate upon which various brackets for supporting the bearing blocks and driving means are mounted.

A drive shaft 23 is journalled in a bracket 24 which is held upon base 50 by bolts 56. A pulley 25 is keyed to shaft 23 that the device may be driven by a suitable belt connected to a prime mover (not shown).

Shaft 23, at its other end, is journalled in one section of a bracket or housing 20 which is attached to base 50 by bolts 54. A bevel gear 22 is keyed to shaft 23 adjacent its inner end and within bracket or housing 20 and a spur gear 38 is keyed thereto at the opposite end adjacent bracket 24.

Bracket 20 also supports and journals a shaft 19 having intermediate its length a bevel gear 21 in mesh with drive shaft gear 22. Shaft 19 has a head thereon (see Figure 4) and a keyway 18 therein. Bearing block 11 is secured against axial displacement upon shaft 19 by a key in keyways 16 and 18. The shaft is secured against longitudinal displacement by a collar 29 which surrounds shaft 19 immediately adjacent block 11.

A bracket 31 is disposed at the front and right hand side of the illustrated machine (Figures 5 and 6) and is secured in position by bolts 57. Bracket 31 has a standard 30 projecting upwardly therefrom. The upper end of standard 30 is threaded and said standard is fastened in position by pin 32. A block 27 rides on standard 30 and is forced downwardly therealong by a spring 33 surrounding standard 30 above the block 27 and held against displacement from the standard by a washer 34 maintained in a fixed position by nut 35 on the threaded end of standard 30.

Block 27 has a threaded aperture through which a machine screw 36 is inserted for engaging the top of bracket 31. A lock nut 37 is supplied upon screw 36, said screw determining the lowermost position which block 27 may attain.

A stub shaft 26 is inserted through block 27 and is held therein by pin 28. Bearing block 12 is mounted upon stub shaft 26 in substantially the same manner as bearing block 11 is mounted upon shaft 19, save that bearing block 12 rotates freely on shaft 26 and is not keyed thereto, whereas bearing block 11 is keyed to shaft 19. Shaft 26 has a head upon it like that on shaft 19.

Such head and the collar 29 on stub shaft 26 prevent longitudinal movement of bearing block 12 on said shaft while admitting of free rotation of the block about the shaft. Rods 10 extend between blocks 11 and 12 as previously described.

A housing or bracket 41 is secured to base 50 by bolts 55. A shaft 40 having a spur gear 39 in mesh with spur gear 38 is journalled in bosses in bracket 24 and bracket 41. A bevel gear 42 is at the inner end of shaft 40 within the housing or bracket 41 and is in mesh with a bevel gear 43 on a shaft 44 journalled in housing or bracket 41.

Shaft 44 is secured to bearing block 11a in the same manner that bearing block 11 is secured to shaft 19.

A shank 48 with a threaded top end is secured in boss 49 on the underside of base 50 by a pin 51 extending through the boss and shank. A spring 52 surrounds the shank and contacts a block 46 which is apertured to receive shank 48. A bolt 53 upon the threaded top of shank 48 limits the upward movement of block 46 under the urge of spring 52.

Block 46 supports a stub shaft 45 held in position by pin 47. Shaft 45 supports bearing block 12a in the same manner that shaft 26 supports bearing block 12. Bars 10 extend from block 11a to 12a in a manner heretofore fully described.

Nut 53 on shank 48 and bolt 36 locked in position by lock nut 37 determines the relative position of blocks 11 and 12a, and 12 and 11a, respectively, and thus fix the position of bars 10 of one series with respect to bars 10 of the second series. Bars 10 of the two series may not interlock one with another more closely than the adjustments of nut 53 and bolt 36 permit, but may be spread further apart as material is drawn between the bars 10 of opposite series. If desired, the bars 10 of one series may be in wiping engagement with the bars 10 of the other series. This insures the detachment of all shredded material as the bars pull away from one another. Springs 33 and 52 are compressed to compensate for excess quantities of material inserted between the two series of bars 10 and also for other irregularities of operation, such as the presence of foreign solid matter.

In operating the device, power is applied to pulley 25. Pulley 25 rotates shaft 23. Shaft 23 rotates shaft 19 and spur gear 38. Spur gear 38 rotates spur gear 39 and shaft 40 to which spur gear 39 is keyed rotates shaft 44. In this manner, bearing blocks 11 and 11a are set in motion and the motion of blocks 11 and 11a causes bars 10 of the two series of rods 10 to travel in opposite directions in substantially circular paths as indicated by the arrows in Figures 5 and 6.

Because of the parallel unaligned faces of bearing blocks 11 and 12, and 11a and 12a, respectively, and the angular extensions on rods 10 terminating in parallel obliquely faced lugs 14, rods 10 do not rotate but move in substantially circular paths and reciprocate as they follow such circular paths.

As arranged in the machine shown in Figures 5 and 6, the rods 10 of one series as they move between the rods 10 of the other series are moved in one direction and the rods in the other series in the opposite direction. For example, the lowermost rods 10 in blocks 11 and 12 are moving to the right of Figure 6 as they pass the uppermost rods 10 in bearing blocks 11a and 12a. Such uppermost rods in blocks 11a and 12a at that time are moving to the left of Figure 6.

Material fed between the two series of bars 10, hence, is compressed by the bars and broken as the rods approach one another as their paths intersect. Such material is drawn between the two series of bars 10 and discharged at the rear of the machine. As the material is drawn through the bars 10, it is thus shredded or ground between the opposed bars of the two series in closest proximity, because the lowermost bars with serrations or teeth 58 therein are moving in one direction across the material while the uppermost bars with similar teeth or serrations are moving across the material in the opposite direction.

There is no tendency of the material to ride toward either side of the machine because the drawing force of the machine is through the machine and the movement of the upper bars longitudinally in one direction is counterbalanced by the longitudinal movement of the lower rods in the opposite direction.

Excess of material or other irregularities are compensated for by the resiliency of springs 33 and 52 as previously described.

The offset relation of the axes of bearing blocks 11 and 12, and 11a and 12a, respectively, causes the bars 10 to traverse elliptical paths that intersect. Such elliptical paths are oblique to a line drawn transversely of the bars 10 at their middle point in the machine shown in Figures 5 and 6. The dimensions of the axes of these elliptical paths depending upon the degree of inclination of the axes of the bearing blocks 11, 11a, 12 and 12a to the axes of the longitudinal centers of bars 10.

The elliptical path of movement to the bars 10 is produced because the end sections of the bar-like members 10 are parallel to the axes of rotation of the bearing blocks (11, 11a, 12 and 12a) and the intermediate portions of said bar-like members are disposed annularly to such axes of rotations, so that the bearing blocks have axes of revolution at an oblique angle to the axes of the longitudinal centers of the bars.

The two sets of bars 10 are oppositely and complementally disposed. When set in motion, they will tend to draw between them any object fed to them transversely of their axes of movement, the direction being governed by the direction of rotation of bearing blocks 11 and 12.

The combination of lateral and longitudinal movement in bars 10 prevents material passing between the two series of bars 10 from becoming entwined in said bars because, as hereinbefore stated, the bars do not rotate. This is a distinct advantage when handling wet and dew laden forage crops.

Heretofore, forage crops cut with standard harvesting instrumentalities have required an indefinite period of favorable weather to cure properly. The presence of the proper amount of sunlight and the proper intensity of the rays were the determining factors for the length of time needed to remove the moisture in the stalk. A long curing period caused by the lack of proper sunshine causes the crop to discolor, lose its natural flavor, and be deprived of much of its valuable vitamin content.

The present invention shreds and mangles the plant stalk, thereby liberating the imprisoned moisture at many points along said stalk. Facilitating the escape of moisture from the stalk in this manner greatly reduces the time required to cure the crops, thereby making the curing process less dependent upon the duration of favorable weather conditions. Decreasing the curing time also tends to retain a greater percentage of the crops, natural qualities hereintofore enumerated.

Although the accompanying drawings illustrate a machine embodying the invention secured to a base-plate, such a machine may be secured to any forage crop harvesting apparatus for cooperating with its cutting instrumentalities.

Machines embodying the invention are not restricted to five bars in each series of bars, and the two series of bars may be horizontally disposed with respect to each other instead of vertically disposed as illustrated.

What is claimed as new and is desired to be secured by Letters Patent of the United States is:

1. A shredder comprising shredding bars disposed in opposed relation to receive therebetween material to be shredded, and means for concurrently moving said opposed bars oppositely and longitudinally and in an arcuate path.

2. A shredder comprising opposed pairs of bearing blocks each pair of blocks being mounted for rotation on parallel non-coincident axes, and parallel bars between said blocks, each end of each bar being mounted upon one of said bearing blocks and for movement relative thereto, and means for rotating said blocks whereby to reciprocate said bars and to move them in parallel closed paths, the bars in one pair of blocks intersecting the path of the bars in the other pair of blocks, and the bars in the two sets moving in longitudinally opposite directions at the point of intersection.

3. A shredder comprising opposed series of bars, means for moving said bars over predetermined intersecting paths with the bars of one series alternating with the bars of the other series, means for imparting longitudinal movements in opposite directions to successive bars, and means to cause each series to clampingly engage material to be shredded.

4. Two shredding elements mounted in opposed relation to receive therebetween material to be shredded, and means for relatively moving the said shredding elements toward each other into material contacting relationship while simultaneously moving said elements oppositely in a direction angularly disposed with respect to their relative movement of approach, said elements having means thereon to frictionally engage the material to be shredded.

5. The combination of a plurality of groups of spaced-apart shredding elements, means to move the elements of each group in a separate predetermined closed path whereby the elements of each group successively approach an element in the opposite group to grip therebetween material to be shredded, said elements of said groups while in engagement with the work material moving relatively in opposite directions to impart a tearing or shredding action on the material.

6. In combination, a pair of cooperating shredding elements adapted to receive material to be shredded therebetween, means for moving each point in one of said elements in a revolutionary path extending in a plane intersecting the longitudinal axis of the element at an angle other than a right angle, and means for moving each point in the other element in a circular path lying in a plane intersecting said first mentioned plane.

7. A shredder comprising opposed series of shredding members adapted to receive therebetween and contact material to be shredded, means for moving the members of one series in orbital paths in one direction and for moving the members of another series in orbital paths in the opposite direction, said orbital paths intersecting, and means for causing relative movement between said series at an angle to said orbit.

8. The combination of two opposed shredding elements mounted to receive therebetween work material to be shredded, means to move said elements simultaneously toward each other in a curved path to clampingly engage the material therebetween while simultaneously moving them in opposite directions substantially transversely to their direction of approach and means to cause the shredding elements to frictionally engage the surface of the material to be shredded whereby to impart a tearing or shredding action on the work material.

9. The combination of two opposed shredding elements mounted to receive therebetween material to be shredded, means to move said elements successively toward and from each other in a curved path to clampingly engage the material overlappingly therebetween while simultaneously moving them in opposite directions substantially transversely to their direction of approach and means to cause the shredding elements to frictionally engage the surface of the material to be shredded whereby to impart a tearing or shredding action on the work material.

10. A shredder comprising two opposed groups of substantially parallel shredding blades each group consisting of a series of blades mounted to move longitudinally and to describe a substantially closed curved path of revolution substantially transversely to said longitudinal direction, the opposed groups being so mounted with relation to one another that their paths of revolution are in substantially opposed directions and their blades maintained in substantially parallel planes at all times and in one position of the said elliptical paths the blades of one group approach the blades of the other group whereby to clamp material to be shredded therebetween, said curved movement causing the closely approaching blades of the two groups to move longitudinally in opposite directions, means for moving the groups of blades and means to permit feeding the material to be shredded therebetween.

11. A shredder comprising two opposed groups of serrated substantially parallel shredding blades each group consisting of a series of blades mounted to move longitudinally and to describe a substantially elliptical path of revolution substantially transversely to said longitudinal direction, the opposed groups being so mounted with relation to one another that their paths of revolution are in substantially opposed directions and their blades maintained in substantially parallel planes at all times and in one position of the said elliptical paths the blades of one group approach the blades of the other group whereby to clamp material to be shredded therebetween, said curved movement causing the closely approaching blades of the two groups to move longitudinally in opposite directions, means for moving the groups of blades and means to permit feeding of material to be shredded therebetween.

WILLIAM E. URSCHEL.